(No Model.)
J. H. MARTIN.
MAIL WAGON.
No. 526,042. Patented Sept. 18, 1894.
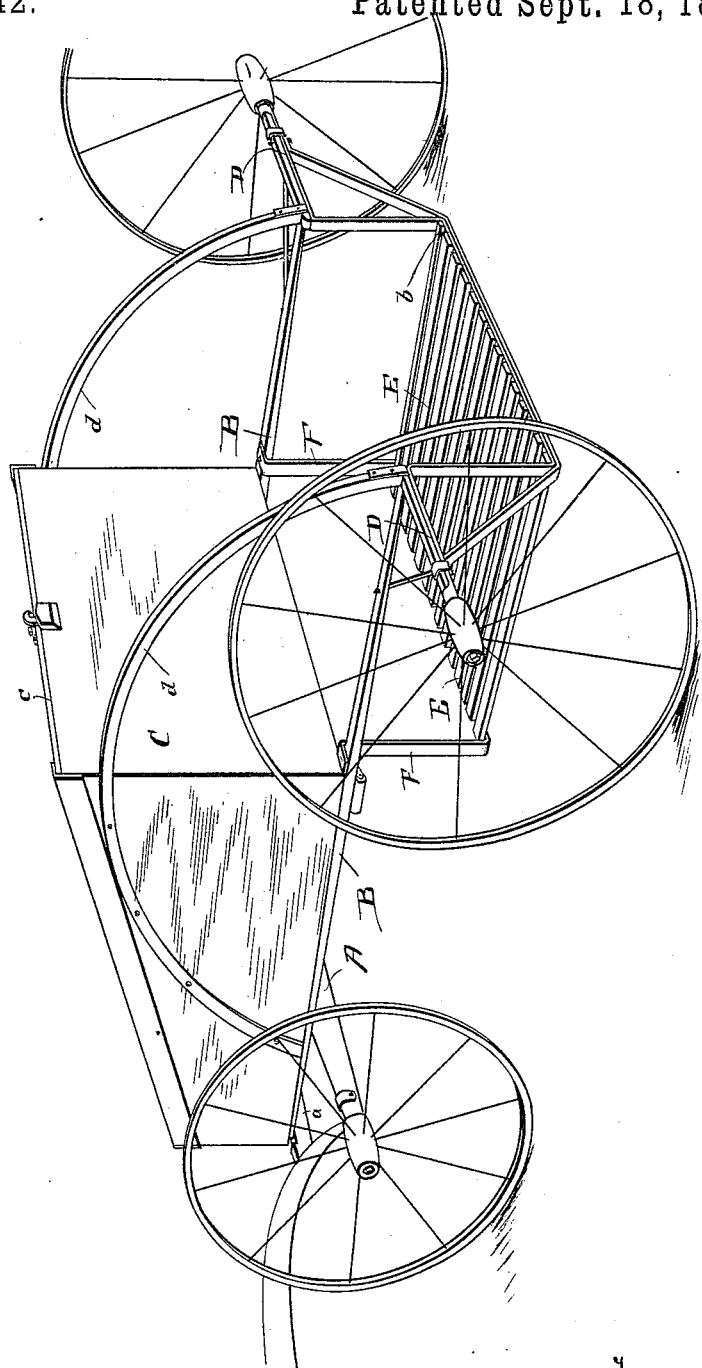
Witnesses.
E. J. Cross.
Henry A. Trump.
Inventor.
John H. Martin
By Fred W. Bond
Attorney.

UNITED STATES PATENT OFFICE.

JOHN H. MARTIN, OF MASSILLON, OHIO.

MAIL-WAGON.

SPECIFICATION forming part of Letters Patent No. 526,042, dated September 18, 1894.

Application filed May 9, 1894. Serial No. 510,628. (No model.)

*To all whom it may concern:*

Be it known that I, JOHN H. MARTIN, a citizen of the United States, residing at Massillon, in the county of Stark and State of Ohio, have invented certain new and useful Improvements in Mail-Vehicles; and I hereby declare that the following is a full, clear, and exact description of the same, reference being had to the annexed drawing, making a part of this specification, and to the letters of reference marked thereon.

The figure shown is an isometrical view of the vehicle.

The present invention has relation to mail vehicles designed and calculated for use in delivering mail, and it consists in the different parts and combination of parts hereinafter described, and pointed out in the claim.

In the accompanying drawing A, represents the front or forward axle, to which is pivotally attached in any convenient and well known manner the bolster $a$. To the bolster $a$, are attached the parallel springs B, which springs are formed of sufficient strength and stiffness to properly support the driver and the mail receptacle C. The rear ends of the springs B, are attached to the rear axle D, which axle, is provided with the lowered portion $b$, which portion is centrally located substantially as shown in the drawing.

Upon the upper sides of the springs B is located the mail receptacle C, which receptacle is located substantially as shown in the drawing. The mail receptacle C, is preferably provided with a sliding top $c$, which top may be moved back and forth to open and close the receptacle. For the purpose of properly supporting the mail receptacle C, and at the same time providing hand holds for the driver, the curved bars $d$, are provided, which curved bars are located substantially as shown, and as shown their rear ends are fixed to the axle D, and their front ends attached to the receptacle C, but it will be understood that the curved bars $d$, may be differently attached without departing from the nature of my invention.

For the purpose of supporting the front or forward end of the platform E, the suspending bar F, is provided, which suspending bar is attached to the springs B, substantially as illustrated in the drawing.

I am aware that two wheeled vehicles provided with a lowered platform have heretofore been used, but their use is unsatisfactory owing to what is known as "horse motion."

By providing a four wheeled vehicle, I am enabled to overcome the horse motion, and at the same time provide a vehicle that will be light, and well adapted for the purpose designed. It will be understood that by suspending the front or forward end of the platform from the springs, said platform will come and go with the vibration of the springs, thereby removing the jar.

Having fully described my invention, what I claim as new, and desire to secure by Letters Patent, is—

In a four wheeled vehicle, the combination of the forward axle A, having pivotally attached thereto the bolster $a$, the parallel springs B, fixed to the bolster $a$ or its equivalent, and the rear axle D, the rear axle D provided with the lowered portion $b$, the platform E, and the suspending bar F, fixed to the springs B, and the hand holds $d$, substantially as and for the purpose specified.

In testimony that I claim the above I have hereunto subscribed my name in the presence of two witnesses.

JOHN H. MARTIN.

Witnesses:
E. A. C. SMITH,
F. W. BOND.